(No Model.)
H. B. LYTLE & J. A. McCOY.
SUPPORT FOR TELEPHONIC TRANSMITTERS.
No. 313,828. Patented Mar. 10, 1885.
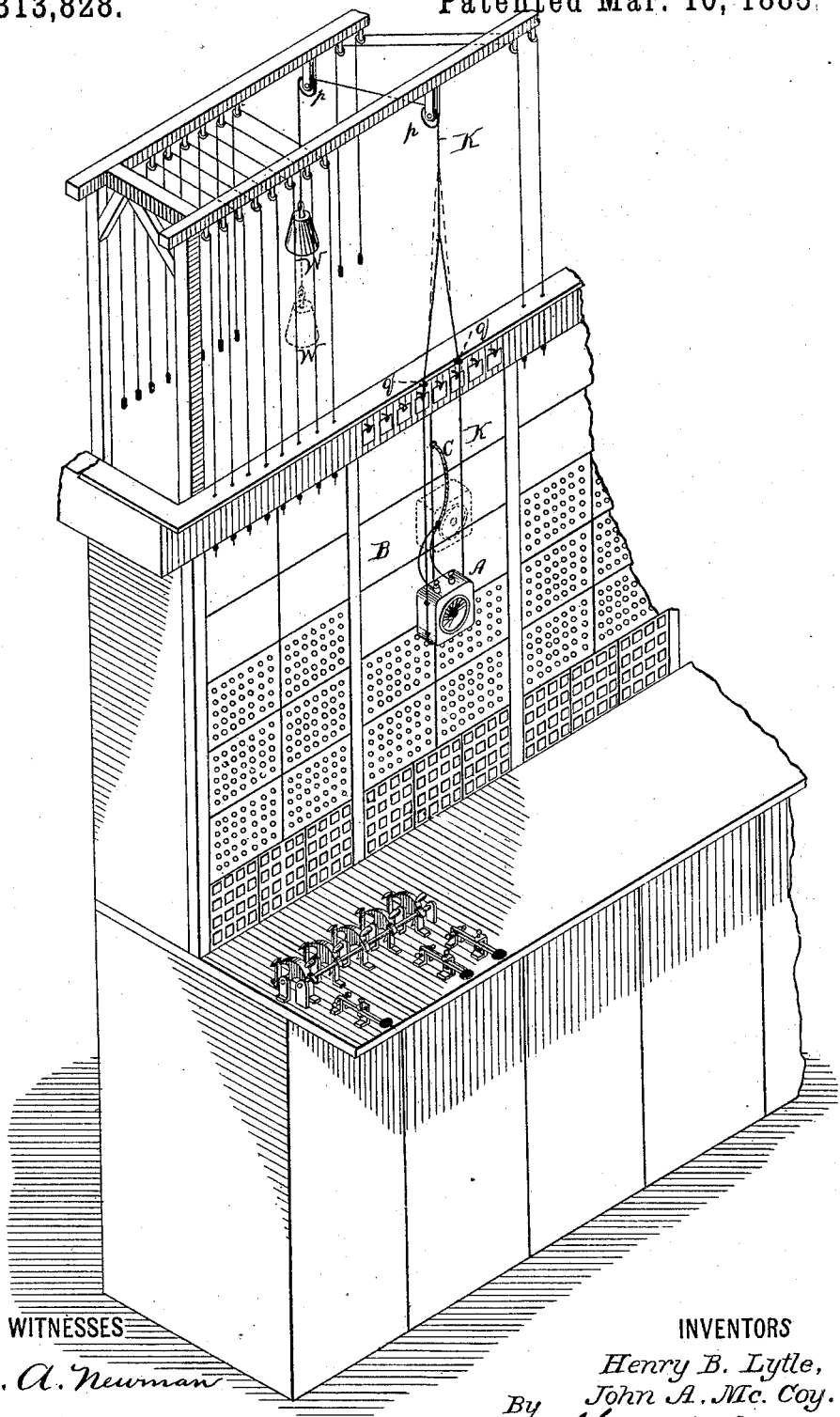
WITNESSES
Ed. A. Newman
Al. C. Newman
INVENTORS
Henry B. Lytle,
John A. Mc. Coy.
By Fred. W. Roger
Atty.

UNITED STATES PATENT OFFICE.

HENRY B. LYTLE, OF BOSTON, MASSACHUSETTS, AND JOHN A. McCOY, OF BALTIMORE, MARYLAND.

SUPPORT FOR TELEPHONIC TRANSMITTERS.

SPECIFICATION forming part of Letters Patent No. 313,828, dated March 10, 1885.

Application filed April 26, 1884. (No model.)

*To all whom it may concern:*

Be it known that we, HENRY B. LYTLE and JOHN A. McCOY, citizens of the United States, the former residing at Boston, in the county of Suffolk and State of Massachusetts, and the latter at Baltimore, Maryland, have invented certain new and useful Improvements in Supports for Telephonic Transmitters, of which the following is a specification.

The object of our invention is to enable a telephonic transmitter to be readily adjusted in position to suit the convenience of the person using it, and to obviate the jarring of the resistance-varying electrodes within the transmitter in such manner as to interfere with the proper action of said electrodes and cause sounds other than those intended to be produced by receivers in circuit with the transmitter.

It is well known that when battery-transmitters having current-varying electrodes in elastic contact are mounted upon rigid supports they are almost constantly, especially in cities, subjected to jarring, which varies the contact between the carbon or similar resistance-varying electrodes, and the consequence is that sounds are produced which mingle with and confuse messages delivered by receivers in contact with such transmitters, and, further, that these extra jarring variations of contact frequently interfere with the action of the electrodes, so as to prevent them from properly varying the current in response to vibrations of the diaphragm.

We obviate the jarring of the transmitter by suspending it freely by means of cords or wires, so that it may yield laterally, and these cords or wires we prefer to pass over suitable supports above the transmitter, and counterweight them in such manner that the transmitter may be adjusted vertically in either direction, and so held to suit the height of the person using it, or the convenience of a person desiring to either sit or stand.

The accompanying drawing gives a perspective view of a transmitter supported at a switch-board according to our invention.

A is the transmitter, which will be understood to be a battery-transmitter having current-varying electrodes held normally in delicate contact with each other by means of springs, and B is a switch-board, with suitable devices of which the transmitter is connected by the cord C, as usual. The transmitter is secured in the lower end of a loop of cord K, the upper end of which is fastened to the end of a cord, K', passed over pulleys $p\,p$ above, and having its other ends attached to a weight, W, which just counterbalances the transmitter, and will therefore retain it at any height to which it may be adjusted, as shown in dotted lines. The side strands of the loop K pass through guides $q\,q$. The transmitter is thus freely suspended and not in contact with anything but the cord-loop, so that there can be communicated to it from its supports no such lateral vibrations or jarring which will interfere with or vary the normal contact of its resistance-varying electrodes, which may be arranged in any well-known or suitable manner.

We of course do not limit ourselves to any particular manner of suspending the transmitter freely or counterweighting the same adjustably, and we may use either one or more cords or wires for suspending the transmitter, or a strap or straps may be used for such purpose.

It will be readily understood that the object of and result accomplished by freely suspending a variable-contact transmitter are quite different from those contemplated in suspending a magneto-telephone which may be used as a transmitter. I lay no claim to a magneto-telephone suspended by a cord, wire, or otherwise. Such telephones were so suspended prior to my herein-described invention.

We are aware that a variable-contact transmitter arranged between and in contact with rigid vertical guides has been suspended by flexible counterweighted cords, and we lay no claim to such a combination, as the rigid guides will transmit jarring to the transmitter and its electrode, and thus produce the objectionable result which it is the object of our improvement to obviate.

What we claim is—

1. The combination of the flexible suspending cord or cords or the equivalent thereof with a variable-contact telephonic transmitter suspended freely thereby out of contact with rigid guides or supports, substantially as described, whereby jarring of the electrodes of the transmitter is prevented.

2. The combination, with the flexible longitudinally-adjustable cord or cords or the equivalent thereof, of the variable-contact telephonic transmitter suspended freely thereby out of contact with rigid guides or supports, suitable guides over which said cord or cords pass above the transmitter, and counter-weight arranged upon said cord or cords for balancing said transmitter, as set forth.

In testimony whereof we affix our signatures in the presence of two witnesses.

HENRY B. LYTLE.
JOHN A. McCOY.

Witnesses:
HARRY Y. DAVIS,
FRED W. ROYCE.